United States Patent [19]
Schörwerth

[11] 4,280,597
[45] Jul. 28, 1981

[54] BRAKE DISC FOR RAILWAY VEHICLES

[75] Inventor: Mathias Schörwerth, Geretsried, Fed. Rep. of Germany

[73] Assignee: Knorr-Bremse GmbH, Munich, Fed. Rep. of Germany

[21] Appl. No.: 885,820

[22] Filed: Mar. 13, 1978

[30] Foreign Application Priority Data

Mar. 17, 1977 [DE] Fed. Rep. of Germany ....... 2711728

[51] Int. Cl.³ .............................................. F16D 65/12
[52] U.S. Cl. ........................ 188/218 XL; 24/259 R; 192/70.13; 192/107 R; 403/155
[58] Field of Search ...................... 188/73.2, 218 XL; 192/107 R, 70.13, 70.16; 24/259 R; 403/155

[56] References Cited

U.S. PATENT DOCUMENTS

| | | |
|---|---|---|
| 1,256,426 | 2/1918 | Baltzley .......................... 24/259 R |
| 2,458,670 | 1/1949 | Young, Jr. ..................... 24/259 R X |
| 2,475,280 | 7/1949 | Erickson ......................... 24/259 R |
| 2,938,755 | 5/1960 | Lee et al. ........................ 267/164 X |
| 3,926,285 | 12/1975 | Preller et al. ................. 188/218 XL |
| 3,958,411 | 5/1976 | Bernt .............................. 403/155 X |

FOREIGN PATENT DOCUMENTS

| | | | |
|---|---|---|---|
| 1134409 | 8/1962 | Fed. Rep. of Germany .... 188/218 XL |
| 531594 | 1/1941 | United Kingdom ................. 24/259 R |
| 607422 | 8/1948 | United Kingdom ................. 24/259 R |

Primary Examiner—George E. A. Halvosa
Attorney, Agent, or Firm—Edward M. Jaskiewicz

[57] ABSTRACT

A brake disc for an axle of a railway vehicle comprises a friction disc annular element mounted concentrically on a hub by a plurality of clamping sleeves or bolts seated in radially opposed bores in the hub and annular element. A pretensioned resilient retaining member exerts a radially inwardly directed force against the radial outer end of each clamping sleeve or bolt. The retaining member is positioned against stop surfaces disposed radially outwardly of the outer end of the cylindrical or bolt element and formed on the ribs which interconnect a pair of axially spaced friction elements constituting the annular element or on the inner surfaces of the friction elements.

8 Claims, 12 Drawing Figures

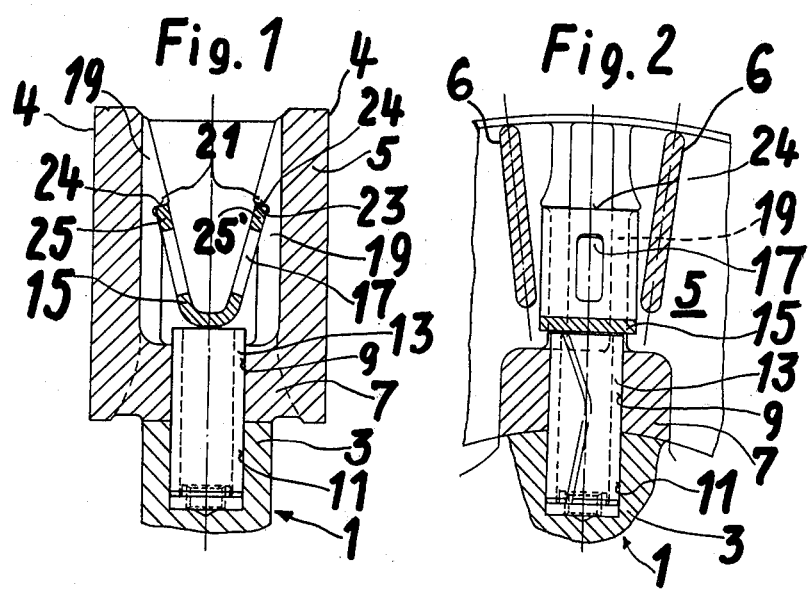
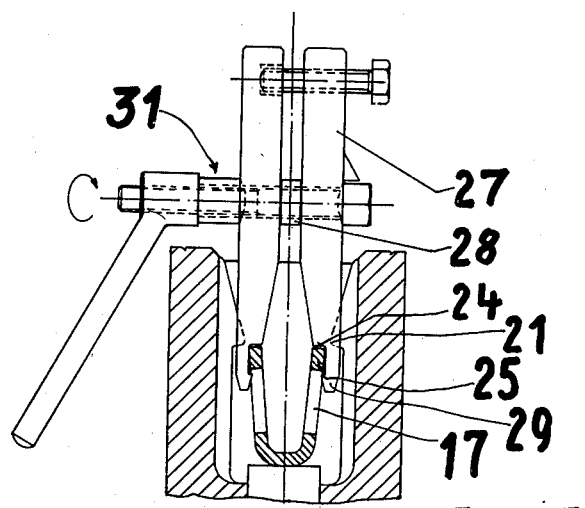

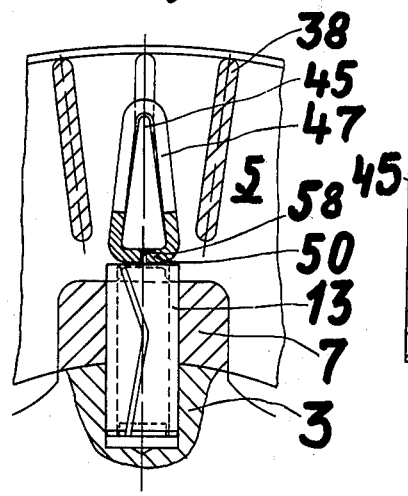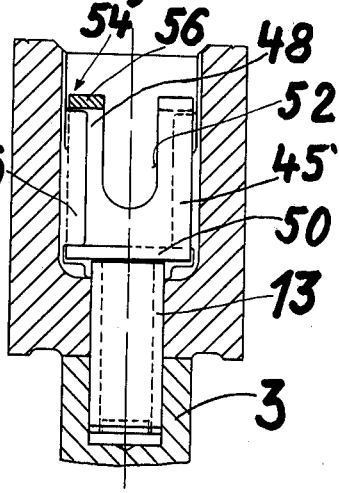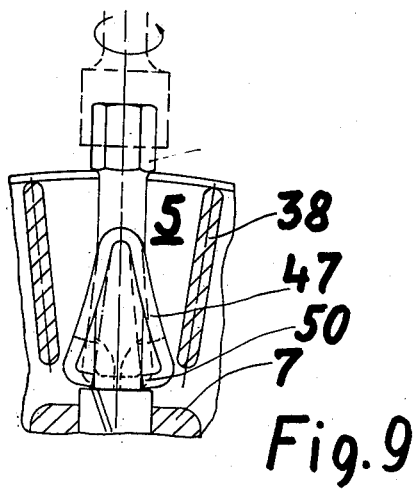

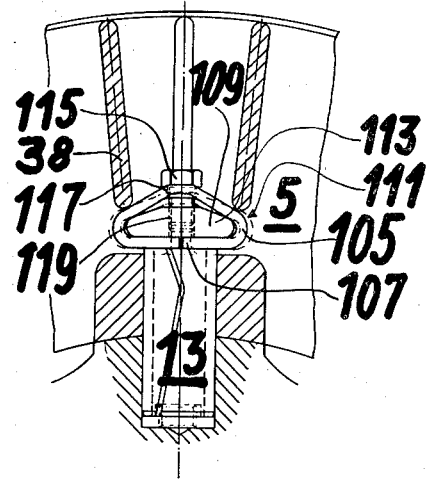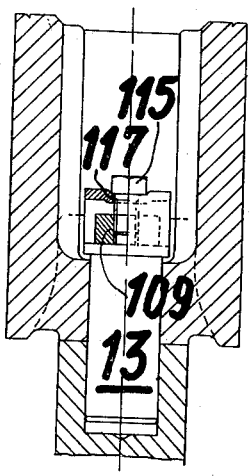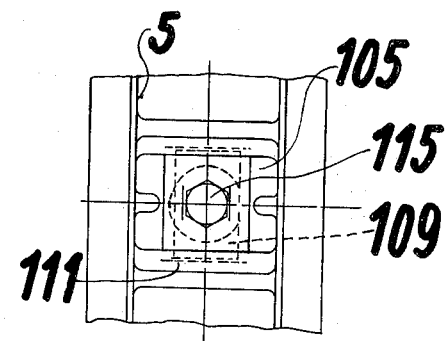

BRAKE DISC FOR RAILWAY VEHICLES

The present invention relates to a brake disc for mounting on the axle of a truck of a railway vehicle, more particularly, to securing the clamping sleeves between the hub and annular element against a radially outward displacement.

A brake disc such as generally used on railway vehicles comprises a hub which can be rigidly mounted on the axle of a wheel and axle assembly of a railway vehicle which is to be braked. A friction disc annular element is mounted concentrically on the hub. A plurality of radially extending sleeve or bolt-type connecting elements are seated in radially opposed bores in the hub and annular element to interconnect the hub and annular element. These connecting elements avoid hindering displacement of the annular disc in the radial direction because of thermal expansion. Means are generally provided to maintain the connecting elements in interconnecting relationship between the hub and annular element.

Cast iron, particularly grey cast iron, having a pearlitic structure or spheroid graphite cast iron, has been advantageously used as a material for the construction of brake discs because such a cast iron has a sufficient hardness and strength together with a relatively rough surface which functions to produce a good braking effect. Such a brake disc is sufficiently rigid to avoid any fluttering effects that may generate noise or bring about a rapid wear of the brake disc. However, the mounting of such a brake disc on the wheel axle such as through a shrink fit gave rise to certain difficulties since the brake disc was susceptible to being heated to relatively high temperatures during the braking operation and the heating of the brake disc adversely affected the secure mounting of the disc upon the axle.

In order to avoid such difficulties which might result from thermal expansion of the brake disc occurring during braking it has been proposed to manufacture the brake disc from two components, such as shown in the German Gebrauchsmuster No. 7,202,507. Such a brake disc comprised a hub formed of steel casting or welded from steel components which hub is attached firmly to the axle such as through shrink fit. Radially mounted on the hub is an outer friction disc annular element formed of cast iron having a pearlitic structure or similar material and attached to the hub.

The annular element functions as the actual brake disc and is generally constructed of two axially spaced annular friction elements interconnected by axially extending ribs or reinforcing members to form a ventilation duct. The annular element is attached to the hub by a number of clamping sleeves or heavy pins which are inserted in radially opposed bores in the hub and annular element. The clamping sleeves are maintained in position by transversely extending rivets or hollow type rivets having a flanged edge.

Such rivets have their ends firmly fixed in the hub and traverse the clamping sleeve in such a manner that there is a radially oriented play between the sleeve and rivet. Thus, securing the clamping sleeves in the radial bores with rivets not only causes problems during the insertion of the rivets into the transverse bores of the clamping sleeves but gives rise to considerable difficulties during the replacement of worn friction disc annular elements because of the relatively poor accessibility to the rivets arising from the manner in which the rivets were previously installed. Further, such rivets are susceptible to shearing as result of strong thermally induced stresses or heavy vibrations. The shearing of individual rivets thus eliminates any structure for securing the clamping sleeve in position.

It is therefore the principal object of the present invention to provide a novel and improved structure for securing the clamping sleeves in such brake discs against a radially outward displacement.

It is another object of the present invention to provide a simple, yet effective structure for securing clamping sleeves against a radial outward displacement which necessitates relatively minor modifications in existing friction disc annular elements.

It is a further object of the present invention to provide such a securing structure which is relatively inexpensive to manufacture, install and remove and which readily absorbs any thermally induced stresses and displacements without deterioration or destruction of the components upon which the clamp securing structure is mounted.

It is an additional object of the present invention to provide such a structure for securing clamping sleeves which is readily accessible for installation and removal and which facilitates the handling of any tools which might be required for such operations.

According to one aspect of the present invention a brake disc particularly adapted to be mounted on the axle of a railway vehicle may comprise a friction disc annular element which is mounted concentrically on a hub. A plurality of radially extending cylindrical clamping sleeves or bolts are utilized as connecting elements between the hub and annular element. The connecting elements are so disposed as to avoid hindering displacement of the annular element in the radial direction as result of thermal expansion. A resilient retaining member engages the radial outer end of a connecting element and has a portion engaging a portion of the annular element in the radial direction. The retaining member is under an initial tension so as to exert a slight radially inwardly directed force on the connecting elements which are seated in radially opposed bores in the hub and annular element. The retaining member prevents any radially outward displacement or shifting of the connecting elements, prevents any displacement resulting from thermal expansion and enables the securing rivets to be readily installed without any modifications to the clamping sleeves or bolts and with only slight modifications on the ventilating duct of the annular member which do not affect its operation.

Other objects and advantages of the present invention will be apparent upon reference to the accompanying description when taken in conjunction with the following drawings, which are exemplary, wherein;

FIG. 1 is an axial sectional view through a portion of a brake disc incorporating the present invention;

FIG. 2 is a radial sectional view of the portion of the brake disc shown in FIG. 1;

FIG. 3 is a view similar to that of the upper portion of FIG. 1 and showing an extraction tool utilized to remove the resilient retaining member according to the present invention;

FIG. 7 is a view similar to that of FIG. 1 and showing a further modification of the present invention;

FIG. 8 is a view similar to that of FIG. 2 and showing the modification of FIG. 7;

FIG. 9 is a view similar to that of FIG. 3 and showing an extraction tool used with the modification of FIG. 7;

FIG. 10 is a view similar to that of FIG. 2 and showing still another modification of the present invention;

FIG. 11 is a view similar to that of FIG. 1 and showing the modification of FIG. 10; and FIG. 12 is a top plan view of the modified retaining member illustrated in FIGS. 10 and 11.

Proceeding next to the drawings wherein like reference symbols indicate the same parts throughout the various views a specific embodiment and modifications of the present invention will be described in detail.

Figure 4:
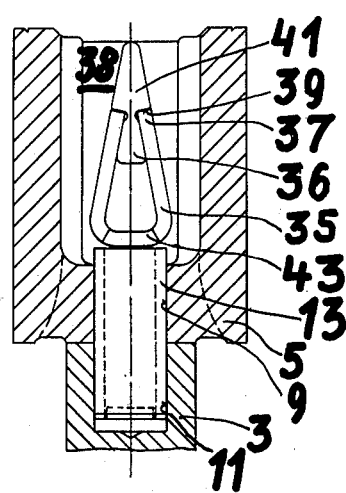
FIG. 4 is a view similar to that of FIG. 1 and showing a modification of the present invention.

A brake disc which incorporates the present invention comprises a hub 1, a portion of which is shown in the drawings, which is mounted on the axle of a wheel and axle assembly by a shrink fit and which axle is also not shown in the drawings. The hub 1 is provided with a plurality of uniformly circumferentially spaced extensions 3. A friction disc annular element 5 is positioned axially upon the periphery of the hub 1 in such a manner that extensions 7 formed in the inner peripheral surface of the annular element 5 are aligned with extensions 3 in the hub 1. A radial bore 9 is formed in the extensions 7 of the annular element 5 and is aligned with a blind radial bore 11 in hub extension 3. Each blind bore 11 has a bottom which may be relatively flat and which may have small passages therethrough to permit the circulation of air. A nut may also be positioned on the bottom so as to engage the inner end of a connecting element which may comprise a heavy clamping sleeve 13 seated in the bores 9 and 11 when the brake disc is assembled. Thus, any braking or retarding moment occurring on the friction disc annular element 5 is transmitted to the axle of the vehicle through the hub 1. In place of the clamping sleeve a relatively heavy pin or bolt may also be used as the connecting element between the annular element 5 and hub 1.

The annular element 5 has opposed lateral surfaces against which brakeshoes are applied in opposite directions. The annular element 5 comprises two axially spaced annular friction elements 4 which define the friction or braking surfaces on their outer faces and these friction elements 4 are interconnected by a plurality of radially extending ribs or webs 6 which also define radially extending ventilating ducts or passages therebetween.

The clamping sleeve 13 is secured according to the present invention by a resilient retaining member or clamp 15 which is shown in FIGS. 1-3. This clamp 15 is formed from a resilient strip of metal into a substantially U-shaped member which has a pair of slightly divergent spring arms as shown in FIG. 1. An elongated recess 17 is formed in each of the wide spring arms as shown in FIGS. 1 and 2. In the ventilation passage between the two friction elements a plurality of radially extending ribs 19 are formed on the inner surfaces of the friction elements which surfaces are away from the outer friction or braking surfaces. The backs or ridges of a pair of such ribs 19 which are axially opposed from each other within the annular element 5 are each provided with a projection 21 in which is formed a stop surface 23 directed toward the rotary axis of the brake disc.

The clamp 15 is initially squeezed axially so as to be pretensioned before introducing the clamp between the outer end of the clamping sleeve 13 and the stop surfaces 23. The ends 24 of the spring arms 25 firmly engage the stop surfaces 23. The end or curved portion of the U-shaped clamp 15 rests upon the annular outer face of clamping sleeve 13. Since the clamp 15 is of a resilient or spring material the distance between the ends of the spring arms of a non-installed or loose clamp will be greater than the distance between the stop surfaces of the two projections 21. As result, once the compressed clamp is installed it is immovable and resists axially outwardly directed forces. The fixing in position of the installed compressed clamp 15 is further intensified because of the fact that each of its spring arms 25 rests on the two ribs 19 arranged at a predetermined distance from each other in the circumferential direction as shown in FIG. 2.

The clamp 15 may be removed from its assembled position as shown in FIG. 3 by means of an extracting tool 27. The clamp 15 is removed prior to removal of the clamping sleeve 13. The sleeve 13 and clamp 15 would be removed such as, for example, to replace the friction disc annular element.

The extraction tool 27 is essentially in the form of tongs and has two levers at the ends of which are formed inwardly directed hook-shaped ends 29. In order to remove the clamp 15, the hook-shaped ends 29 are inserted between two adjacent ribs 19 on the inner surfaces of the friction elements to such a distance that the hook-shaped ends 29 can engage from behind the upper edge of the elongated opening 17 provided in each spring arm 25. The tong levers are then pulled together by a screw device indicated at 31 until their hook-shaped ends 29 press the ends of the spring arms 25 into the positions as shown in FIG. 3 such that the spring arms can be withdrawn radially outwardly past the projections 21. The clamp 15 can thus be completely removed from the ventilation duct within the annular element.

Figure 5:
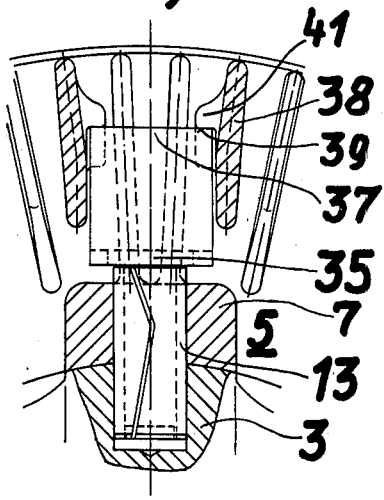
FIG. 5 is a view similar to that of FIG. 2 and showing the modification of FIG. 4.
Figure 6:
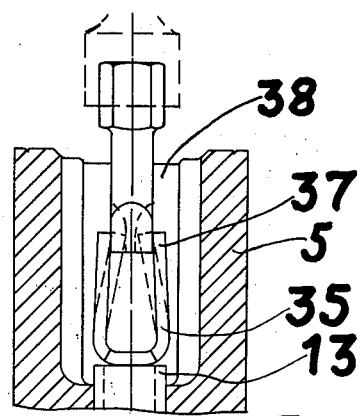
FIG. 6 is a view similar to that of FIG. 3 and showing an extraction tool used with the modification of FIG. 4.

In FIGS. 4-6, there is illustrated a resilient retaining member or clamp 25 which is similarly made of a resilient strip of metal into approximately the shape of a horseshoe magnet or substantially U-shaped with slightly converging spring arms 37. The end portions of spring arms 37 engage a radially outward tapering portion 36 formed on opposing faces of two radially extending cooling ribs 38. The end portions 37 of the spring arms are pretensioned inwardly toward the lateral surfaces of the radially outwardly tapering portion 36 such that these end portions are immovably positioned on stops 39 formed on projection 41. The clamp 37 is provided with a recess 43 on each of its two sides in its lower portion that contact the annular surfaces of the clamping sleeve 13. These recesses enable the clamp 35 to be guided past the projections 41 into the inserted or assembled position.

In order to remove an assembled clamp 35, it is merely necessary to introduce a relatively wide blade of a screwdriver between the end portions 37 of the spring arms. The screwdriver blade is then pivoted through a 90° angle in the gap between the end portions 37 to spread apart the spring arms of the clamp. The clamp with the spread spring arms can then be pulled radially outwardly through the maximum width area of the retaining projection 41.

In FIGS. 7-9 there is shown a spring clamp 47 which can be used to secure the clamping sleeve 13 in position.

The inner surfaces of the friction elements, that is the surfaces away from the outer friction or braking surfaces, are each provided with projections 45 opposed from each other as shown in FIG. 8. The projections 45 increase in width in the circumferential direction toward the axis of rotation of the brake disc and end closely above the assembled clamping sleeve 13 so as to form a gap between the end of projection 45 and the annular end surface of sleeve 36 which gap corresponds to the thickness of material used to form the clamp 47.

The clamp 47 is substantially U-shaped and is provided with two spring arms which diverge with respect to each other at a relatively small acute angle. The end portions of the spring arms are bent inwardly toward each other at 50 so as to engage the underside of the projection 45. The upper U-shaped connecting portion 54 of clamp 47 is provided with a recess or cut out portion 52 which extends along approximately ⅔ of each of the spring arms as shown in FIGS. 7 and 8. Thus, the ends of the clamp 47 rest upon projection 45 with portions of its spring arms being disposed on either side of the projection 45. The lower third of the spring arms and the bent end portions 50 are unchanged in their width and, except for a small play or clearance fully occupy the space existing between the facing surfaces of the ventilating duct as shown in FIG. 8.

In order to install the clamp 47 to secure an assembled clamping sleeve 13 in position, a gap 58 existing between the ends of bent endportions 50 is positioned on the upper blunt-tipped end portion of projection 45. By applying a strong force on the upper rounded portion 54 of the clamp or by striking such portion, the clamp 47 is driven over projection 45 radially inwardly toward the axis of rotation of the brake disc while the spreading of the end portions continues until these end portions are seated around the radially inwardly surface or projections 45 in the assembled position as shown in FIG. 7.

In order to remove an installed clamp 47 a screwdriver is used in the same manner as described in connection with the modification of FIGS. 4–6. The relatively wide edge of the screwdriver blade is introduced radially downwardly through recess 52 between the spring arms into the gap 58. The screwdriver is then pivoted by 90° while the clamp is held by the walls of the ventilating duct against rotation. The bent end portions 50 are spread to such an extent that they can be passed over the lower or maximum width portion of projection 45 and then be completely withdrawn from the ventilating duct from the area above the clamping sleeve 13.

It is known that in operation brake discs expand considerably in a radially outwardly direction as result of the heating of the brake disc generated during a braking operation. This means that the stop positions 23 and 39 for supporting clamps 15 and 35 are displaced radially outwardly by small distances with respect to the annular end surface of the corresponding clamping sleeve 13. This would result in a play between the annular end surface of clamping sleeve 13 and the curve end portions of clamps 15 or 35 in contact with the end surface of sleeve 13 but because of their clamping effect the clamps will be held immovable upon their respective stops. In order to avoid the occurrence of any such play the clamps or resilient retaining members are provided with a shape in which they are pretensioned slightly in the longitudinal direction. This shape resides in the divergence or convergence of the spring arms so that such clamps can be pretensioned in their respective longitudinal directions.

In FIGS. 10–12 there is shown a further modification of a resilient retaining member for securing the clamping sleeve 13 in position which does not require any modifications of structure on the walls of the ventilating duct of the annular element for the installation of the clamp. The clamp of this modification is positioned below the radially inner ends of existing radially extending cooling ribs interconnecting the friction elements and positioned between the interconnecting or reinforcing ribs. Thus, existing brake discs can be readily provided at any time with a securing structure according to the present invention to retain the clamping sleeves in position.

In FIGS. 10–12, there is shown a resilient retaining member or clamp 105 similarly constructed of a resilient strip of metal and bent into the shape of a flattened triangle the apex of which is directed radially outwardly and whose base is formed from inwardly bent end portions 107 of spring arms of the clamp 105. Within the triangular clamp 105 there is located a substantially wedge-shaped expansion member 109 which has a height less than the height of the triangular clamp 105 so that a gap or space is formed between the upper portion of expansion member 109 and the inner surface of the apex of clamp 105. Thus, the expansion member 109 is flatter than the triangular clamp 105 and the clamp 105 encloses this expansion member 109 so as to contact its end areas 113 merely with its bent portions 111. The clamp 105 is provided in its upper or apex area with an opening 117 through which is passed a screw 115 and inserted into a threaded bore 119 in the expansion member 109.

When the clamp 105 together with its expansion member 109 is introduced into the ventilating duct into the position shown by the dashed lines in FIG. 10, the screw 115 is tightened whereupon the upper portions of the clamp 105 and expansion member 109 are drawn toward each other to reduce the gap or space therebetween. As this space is reduced, the clamp 105 is tensioned to exert an inwardly directed radial force against the end of clamping sleeve 13.

Each of the clamps as disclosed herein thus exerts a slight radially inwardly directed initial tension force against the ends of the clamping sleeves which are supported at the bottoms of the bores formed in the hub 1. The bottom of the bore may thus be flat and provided with passages to permit the circulation of air therethrough or the inner end of the clamping sleeve may rest upon a nut positioned upon the bottom of the blind bore in hub 1.

Thus it is apparent that according to the present invention a reliable and effective device is provided for securing the clamping sleeves in position but which do not hinder any displacement of the clamping sleeves radially outwardly because of thermal expansion. The retaining member according to the present invention can be used on existing brake disc installations or modifications thereof can be used with brake discs which have been modified slightly in accordance with the present invention.

It will be understood that this invention is susceptible to modification in order to adapt to different usages and conditions, and accordingly, it is desired to comprehend such modifications within this invention as may fall within the scope of the appended claims.

What is claimed is:

1. In a brake disk adapted to be mounted on the axle of a railway vehicle, the combination of a hub, a friction disk annular element mounted concentrically on said hub, a radially extending cylindrical connecting element having an outer end interconnecting said hub and annular element so as to avoid hindering displacement of the annular element in the radial direction due to thermal expansion, means for maintaining said connecting element in interconnecting relationship between said hub and annular element, said maintaining means comprising a removable resilient retaining member immovably positioned between and engaging said connecting element outer end and a stop surface portion of said annular element disposed radially outwardly of said connecting element outer end and directed toward said end, said retaining member being U-shaped and having a bight portion engaging said end and having a pair of substantially straight spring arms extending in the radial direction from said bight portion and engaging said stop surface such that said retaining member can axially resist between said connecting element outer end and said stop surface portion outwardly directed forces so as to prevent radially outward displacement of the connecting element, said retaining member being under an initial tension so as to exert a radially inwardly directed force on said connecting element.

2. In a brake disk as claimed in claim 1 wherein said annular element comprises a pair of axially spaced annular friction elements each having a friction surface on its outwardly directed face and a plurality of axially extending ribs interconnecting said friction elements and defining ventilation ducts therebetween, said stop surface portion including a pair of opposed stop surfaces on the surfaces of said friction elements away from said friction surfaces and directed toward the axis of the brake disk, said resilient retaining member being disposed between said stop surfaces and the outer end of the cylindrical connecting element.

3. In a brake disc as claimed in claim 2 wherein there are radially extending ribs on the surfaces of said friction elements away from said friction surfaces and there being projections on said ribs to define said stop surfaces.

4. In a brake disk as claimed in claim 2 wherein there are projecting portions on the surfaces of said interconnecting ribs facing toward each other, there being a pair of stop surfaces on each of said projecting portions.

5. In a brake disc as claimed in claim 1 wherein said U-shaped resilient retaining member is formed from a resilient strip of metal to define said pair of diverging spring arms, each spring arm having an opening therein and having an end which engages a stop surface.

6. In a brake disc as claimed in claim 5 wherein said openings are each elongated longitudinally of the respective spring arm to receive hook-shaped ends of an extracting tool.

7. In a brake disk as claimed in claim 1 wherein said resilient retaining member is under compression in its longitudinal direction and its spring arms have a resiliency in the directions toward and away from each other.

8. In a brake disk adapted to be mounted on the axle of a railway vehicle, the combination of a hub, a friction disk annular element mounted concentrically on said hub, said annular element comprises a pair of axially spaced annular friction elements each having a friction surface on its outwardly directed face, a radially extending cylindrical connecting element having an outer end interconnecting said hub and annular element so as to avoid hindering displacement of the annular element in the radial direction due to thermal expansion, means for maintaining said connecting element in interconnecting relationship between said hub and annular element, said maintaining means comprising a removable substantially U-shaped resilient retaining member formed by a resilient strip of metal to define a pair of diverging spring arms the end portions of which are bent inwardly toward each other, a pair of triangular projections having apexes directed radially outwardly on the surfaces of said friction elements away from said friction surfaces and having bases spaced from the outer ends of said cylindrical connecting element at a distance corresponding to the thickness of said metal strip, said spring arm bent end portions positioned under said bases and there being a gap between the ends of said end portions, said retaining member bent end portions resisting between said connecting element outer end and said bases outwardly directed forces so as to prevent radially outward displacement of the connecting element.

* * * * *